(12) United States Patent
Brenner et al.

(10) Patent No.: US 7,236,105 B2
(45) Date of Patent: Jun. 26, 2007

(54) ANTI COLLISION LIGHT FOR AIRCRAFT

(75) Inventors: Paul E. Brenner, Kastanienbaum (CH);
Heini E. Hirni, Sulzbach (CH);
Thomas Schedler, Schleinikon (CH)

(73) Assignee: Flight Components AG, Bachenbuelach (CH)

( * ) Notice: Subject to any disclaimer, the term of this patent is extended or adjusted under 35 U.S.C. 154(b) by 90 days.

(21) Appl. No.: 11/033,275

(22) Filed: Jan. 12, 2005

(65) Prior Publication Data

US 2006/0077071 A1 Apr. 13, 2006

(30) Foreign Application Priority Data

Oct. 11, 2004 (EP) .................................. 04024156

(51) Int. Cl.
*B64D 47/06* (2006.01)
(52) U.S. Cl. ................. 340/981; 340/815.45; 362/470; 362/545; 362/800
(58) Field of Classification Search ............ 340/815.4, 340/981, 983, 815.45; 315/241 S; 362/317, 362/470, 545, 800
See application file for complete search history.

(56) References Cited

U.S. PATENT DOCUMENTS

| 2,555,807 | A | | 6/1951 | Morris ........................ 240/7.7 |
|---|---|---|---|---|
| 3,174,552 | A | | 3/1965 | Soucy, Jr. .................... 170/159 |
| 4,325,608 | A | | 4/1982 | Kamiya et al. .............. 350/165 |
| 4,527,158 | A | * | 7/1985 | Runnels ....................... 340/961 |
| 4,695,939 | A | | 9/1987 | Canay ........................... 363/39 |
| 4,829,407 | A | | 5/1989 | Bushell et al. ................ 362/29 |
| 4,935,665 | A | * | 6/1990 | Murata ........................ 313/500 |
| 5,499,010 | A | | 3/1996 | Cohn .......................... 340/479 |
| 5,579,162 | A | | 11/1996 | Bjornard et al. ............ 359/580 |
| 5,642,933 | A | * | 7/1997 | Hitora ........................ 362/243 |
| 5,710,560 | A | | 1/1998 | Cohn .......................... 340/982 |
| 5,929,788 | A | * | 7/1999 | Vukosic ................... 340/908.1 |
| 6,011,493 | A | | 1/2000 | Bushell et al. .............. 340/981 |
| 6,278,382 | B1 | * | 8/2001 | DeMarco et al. ........... 340/981 |
| 6,367,949 | B1 | | 4/2002 | Pederson |
| 6,464,373 | B1 | * | 10/2002 | Petrick ........................ 362/235 |
| 6,525,668 | B1 | * | 2/2003 | Petrick .................. 340/815.45 |

(Continued)

FOREIGN PATENT DOCUMENTS

DE 20311169 11/2003

(Continued)

OTHER PUBLICATIONS

Catalogue page from WHELEN Engineering Company which was available to the public prior to Oct. 11, 2004.

(Continued)

*Primary Examiner*—Brent A. Swarthout
(74) *Attorney, Agent, or Firm*—Greenblum & Bernstein, P.L.C.

(57) ABSTRACT

Anti collision light for an aircraft includes a number of light emitting diodes (LEDs) arranged on a common plane. A reflecting arrangement is located above the plane and reflects the light emitted by the diodes in a sidewards direction. A surrounding reflecting arrangement can be provided around the diodes and an additional reflecting arrangement in form of a layer on the plane may also be utilized. This Abstract is not intended to define the invention disclosed in the specification, nor intended to limit the scope of the invention in any way.

46 Claims, 4 Drawing Sheets

U.S. PATENT DOCUMENTS

| | | |
|---|---|---|
| 6,695,462 B2 * | 2/2004 | Rohlfing et al. ............ 362/328 |
| 7,079,041 B2 * | 7/2006 | Fredericks et al. .... 340/815.45 |
| 2002/0080023 A1 | 6/2002 | DeMarco et al. ........... 340/463 |
| 2002/0101189 A1 | 8/2002 | Vo et al. .................. 315/241 S |
| 2003/0193807 A1 | 10/2003 | Rizkin et al. ............... 362/317 |
| 2004/0075575 A1 | 4/2004 | DeMarco et al. ........ 340/815.4 |
| 2004/0085779 A1 | 5/2004 | Pond et al. |

FOREIGN PATENT DOCUMENTS

| | | | |
|---|---|---|---|
| JP | 2000045237 | * | 2/2000 |
| WO | 02/102662 | | 12/2002 |

OTHER PUBLICATIONS

Web page from Thales Optronic Systems which was availale to the public prior to Oct. 11, 2004.

Catalogue page from GOODRICH which was available to the public prior to Oct. 11, 2004.

Two catalogue pages from OXLEY Inc., which was available to the public prior to Oct. 11, 2004.

Web page from Honeywell which was available to the public prior to Oct. 11, 2004.

* cited by examiner

ANTI COLLISION LIGHT FOR AIRCRAFT

CROSS REFERENCE TO RELATED APPLICATIONS

This application claims priority under 35 U.S.C. § 119 of European Patent Application No. 04 024 156.4 filed on Oct. 11, 2004, the disclosure of which is expressly incorporated by reference herein in its entirety.

BACKGROUND OF THE INVENTION

1. Field of the Invention

The invention relates to an anti collision light for aircraft and, in particular, to such a light with light emitting diodes as light sources.

2. Discussion of Background Information

Agencies such as, e.g., EASA (European Aviation Safety Agency) or FAR (Federal Aviation Regulations) have international regulations for airborne aircraft with fixed wings or rotary wings (airplanes or helicopters) which require an external lighting which, in addition to the position lights, requires so called anti collision lights which must radiate by day and by night above a certain minimal intensity indicated in Candela. According to EASA, the anti collision lights must, e.g. radiate in red ("aviation red") or in white ("aviation white") with a predetermined intensity and color, and also within a given solid angle.

A usual source for flashing anti collision lights is, for example, provided by Xenon flashing tubes which emit a light spectrum that appears white to the human eye, and which is provided with a red filter (typically red glass) for operation in the red spectral region. It is known, as well, to provide anti collision lights with light emitting diodes (LEDs) as light sources.

SUMMARY OF THE INVENTION

The present invention aims to provide a LED anti collision light with a compact design and providing ease of manufacturing.

In order to implement these and still further objects of the invention, which will become more readily apparent in the foregoing description, the anti collision light includes a number of light emitting diodes arranged on a common plane and a reflecting arrangement arranged above the plane for reflecting light emitting from the diodes essentially perpendicular to the plane in a sidewards direction.

The common plane allows an automated well defined mounting of the LEDs and an equal reflection angle for all the light beams emitting from the diodes on the reflecting arrangement.

Preferably, the reflecting arrangement is a reflector common to several or all diodes which allows for a very even light distribution and simple construction.

In a preferred embodiment, a second plane with diodes having their own reflecting arrangement is provided. It is further preferred to provide the planes as circuit boards on which the diodes are mounted and by which the voltage and current are fed directly to the diodes. In another preferred embodiment the diodes are surrounded adjacent the circuit board or boards, respectively, by third and/or fourth reflecting arrangements and it is preferred in another embodiment to have one or more fifth reflecting arrangements in the form of a reflecting layer on the plane or planes, respectively, in an area or in areas around some or each of the diodes.

The invention also provides for an anti collision light for an aircraft, wherein the anti collision light comprises a plurality of light emitting diodes (LEDs) arranged on a common plane and at least one reflecting arrangement arranged above the plane for reflecting light emitted by the plurality of LEDs essentially perpendicular to the plane and in a sidewards direction.

The at least one reflecting arrangement may comprise a reflector which is common to one of several of the plurality of LEDs and all of the plurality of LEDs. The plane may be arranged on a circuit board and wherein the plurality of LEDs are mounted directly to the circuit board. At least some of the plurality of LEDs may be surrounded by surrounding reflecting arrangements, and wherein each surrounding reflecting arrangement directs light emitted sidewardly by a respective LED in a direction essentially perpendicular to the plane and towards the reflecting arrangement.

The anti collision light may further comprise a second plurality of LEDs arranged on a second common plane, wherein the plane and the second plane face in opposite directions and a second reflecting arrangement arranged above the second plane for reflecting light emitted by the second plurality of LEDS essentially perpendicular to the second plane and in a sidewards direction.

The second reflecting arrangement may comprise a second reflector common to one of several of the second plurality of LEDs and all of the second plurality of LEDs. The plane may be arranged on a first circuit board, the second plane is arranged on a second circuit board, the plurality of LEDs are directly mounted to the first circuit board, and the second plurality of LEDs are directly mounted to the second circuit board.

At least some of the plurality of LEDs may be surrounded by first surrounding reflecting arrangements, each first surrounding reflecting arrangement may direct light emitted sidewardly by a respective LED in a direction essentially perpendicular to the plane and towards the reflecting arrangement, and at least some of the second plurality of LEDs may be surrounded by second surrounding reflecting arrangements, each second surrounding reflecting arrangement may direct light emitted sidewardly by a respective LED in a direction essentially perpendicular to the second plane and towards the second reflecting arrangement.

The first surrounding reflecting arrangements may be mounted on the first plane and wherein the second surrounding reflecting arrangements are mounted on the second plane. The first surrounding reflecting arrangements may comprise first holes arranged on a first ring shaped part, the first holes comprise reflecting sidewalls, and the second surrounding reflecting arrangements may comprise second holes arranged on a second ring shaped part, the second holes comprise reflecting sidewalls.

The plurality of LEDs may be arranged in a configuration. The configuration may comprise one of a circular configuration, a curved configuration, a horseshoe configuration, and a matrix configuration.

The anti collision light may further comprise a first additional reflecting arrangement arranged on the plane and a second additional reflecting arrangement arranged on the second plane. At least one of the first additional reflecting arrangement may comprise a first reflecting layer arranged on the plane and the second additional reflecting arrangement may comprise a second reflecting layer arranged on the second plane.

The anti collision light may further comprise an additional reflecting arrangement arranged on the plane. The additional reflecting arrangement may comprise a reflecting layer arranged on the plane.

Each of the reflecting arrangement and the second reflecting arrangement may comprise a parabolically shaped reflecting surface and a circular outer rim. Each of the reflecting arrangement and the second reflecting arrangement may comprise a parabolically shaped reflecting surface. The reflecting arrangement may comprise a parabolically shaped reflecting surface and a circular outer rim. The plane may be arranged on one of a first circular plate and a first circular circuit board and wherein the second plane is arranged on one of a second circular plate and a second circular circuit board. The plane may be arranged on one of a circular plate and a circular circuit board. Each of the reflecting arrangement and the second reflecting arrangement may comprise a parabolically shaped reflecting surface and two separate circular rims.

The reflecting arrangement may comprise a parabolically shaped reflecting surface, a circular outer rim and a circular inner rim. Each of the reflecting arrangement and the second reflecting arrangement may comprise a parabolically shaped reflecting surface and two separate horse-shoe and/or u-shaped rims. The reflecting arrangement may comprise a parabolically shaped reflecting surface, a horse-shoe and/or U-shaped outer rim and a horse-shoe and/or U-shaped inner rim. Each of the reflecting arrangement and the second reflecting arrangement may comprise a parabolically shaped reflecting surface, a U-shaped rim, and a linear edge.

The reflecting arrangement may comprise a parabolically shaped reflecting surface, a U-shaped rim, and a linear edge. The plurality of LEDs may be lensless LEDs. At least some of the plurality of LEDs may be covered by a material which comprises at least one of a light transparent mass and a pourable silicone mass. At least some of the plurality of LEDs may comprise a frame for the material.

The anti collision light may further comprise a support arranged to support and space apart the plane and the second plane. The anti collision light may further comprise a support arranged to support the plane.

The plane, the second plane, the reflecting arrangement, and the second reflecting arrangement may be arranged along at least one of a common longitudinal axis and an axis that is the same as a socket of the anti collision light. The plane and the reflecting arrangement may be arranged along at least one of a common longitudinal axis and an axis that is the same as a socket of the anti collision light.

The plane, the second plane, the reflecting arrangement and the second reflecting arrangement may be arranged within a U-shaped bracket. The plane and the reflecting arrangement may be arranged within a U-shaped bracket.

The anti collision light may further comprise a housing, a first circuit board and a second circuit board, wherein the plurality of LEDs, the second plurality of LEDs, and the first and second circuit boards are arranged within the housing.

The anti collision light may further comprise a housing and a circuit board, wherein the plurality of LEDs and the circuit board are arranged within the housing.

The invention also provides for an anti collision light for an aircraft, wherein the anti collision light comprises a plurality of light emitting diodes (LEDs) mounted directly on a circuit board, a reflecting arrangement arranged above the circuit board for reflecting light emitted by the plurality of LEDs essentially perpendicular to a plane of the circuit board in a sidewards direction, and at least one of the plurality of LEDs being surrounded by a surrounding reflecting arrangement mounted on the circuit board and directing light emitted sidewardly by the at least one of the plurality of LEDs in a direction essentially perpendicular to the plane.

The plane of the first circuit board and the plane of the second circuit board may face in opposite directions. The anti collision light may further comprise at least one of a first additional reflecting arrangement and a second additional reflecting arrangement. At least one of the first and second additional reflecting arrangements comprise a reflecting layer.

The invention also provides for an anti collision light for an aircraft, wherein the anti collision light comprises a first plurality of light emitting diodes (LEDs) mounted directly on a first circuit board, a first reflecting arrangement arranged above the first circuit board for reflecting light emitted by the first plurality of LEDs essentially perpendicular to a plane of the first circuit board in a sidewards direction, at least one of the first plurality of LEDs being surrounded by a first surrounding reflecting arrangement mounted on the first circuit board and directing light emitted sidewardly by the at least one of the first plurality of LEDs in a direction essentially perpendicular to the plane of the first circuit board, a second plurality of LEDs mounted directly on a second circuit board, a second reflecting arrangement arranged above the second circuit board for reflecting light emitted by the second plurality of LEDs essentially perpendicular to a plane of the second circuit board in a sidewards direction, and at least one of the second plurality of LEDs being surrounded by a second surrounding reflecting arrangement mounted on the second circuit board and directing light emitted sidewardly by the at least one of the second plurality of LEDs in a direction essentially perpendicular to the plane of the second circuit board.

The plane of the first circuit board and the plane of the second circuit board may face in opposite directions. The anti collision light may further comprise at least one of a first additional reflecting arrangement and a second additional reflecting arrangement. At least one of the first and second additional reflecting arrangements comprise a reflecting layer.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figures 1, 2, 3, 4:
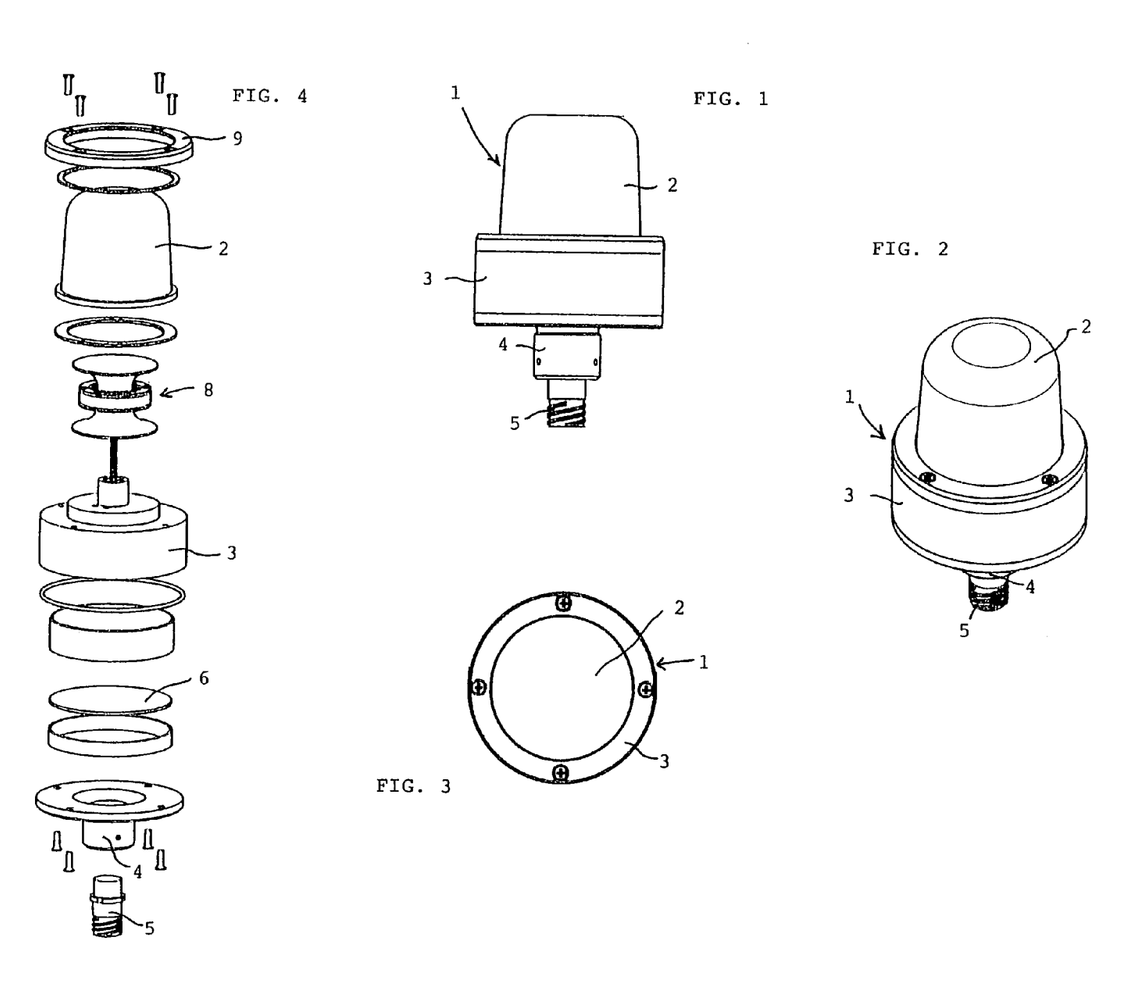
FIG. 1 shows a side view of a first embodiment.
FIG. 2 shows a perspective view of the embodiment shown in FIG. 1.
FIG. 3 shows a top view of the embodiment shown in FIG. 1.
FIG. 4 shows an exploded view of the embodiment shown in FIG. 1.

A first embodiment of an anti collision light for an aircraft (hereinafter called ACL) is shown in FIGS. 1–10. FIGS. 1–3 show the ACL 1 from the outside in different views wherein it can be seen that the ACL 1 comprises a socket parts 4 and 5, a main housing 3, and a transparent cover 2. Arranged within the transparent cover 2 is a module 8 that includes light emitting diodes 13 (not shown in FIG. 1–3). The exploded view of FIG. 4 shows the same elements and exposes the module 8 arranged on the housing part 3 and covered by the transparent cover 2. A ring shaped collar 9 is utilized to mount the cover 2 to the housing 3. The module 8 is mounted to the housing 3 as will be shown later in FIG. 8. Also arranged within the housing 3 are the electronic components for generating the low voltage "dc" current for feeding and/or powering the light emitting diodes 13 with power from a higher voltage "dc" or "ac" current. These components can be arranged on a circuit board 6. The housing 3 is closed by a lower part 4 which can belong to the socket part 5 or which can be part of the housing 3 itself. The socket parts 4 and 5 can be a screw type socket as shown or can be of any other type for mounting the ACL 1 to the aircraft as known to the man skilled in the art.

Figure 5:
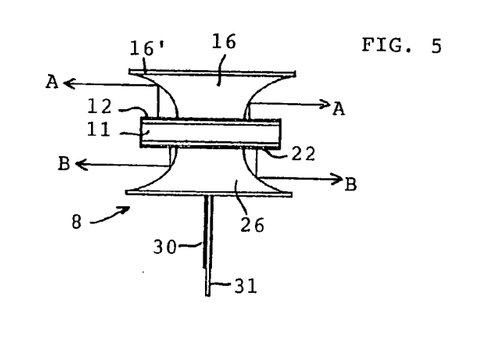
FIG. 5 shows an inner module of the anti collision light shown in FIG. 1 with two planes in a side view.
Figure 6:
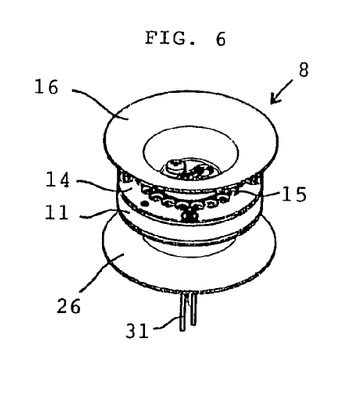
FIG. 6 shows a perspective view of the module.
Figure 7:
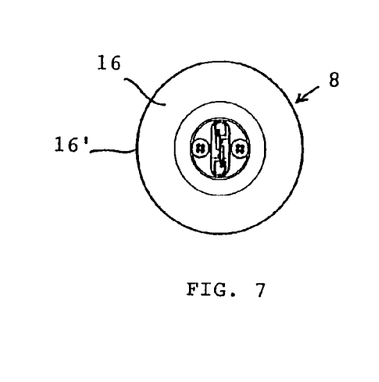
FIG. 7 shows a top view of the module.
Figure 8:
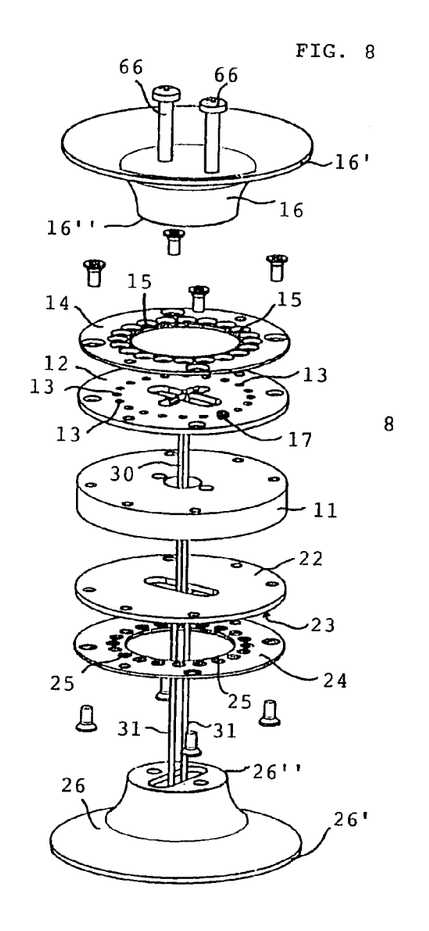
FIG. 8 shows an exploded view of the module.

FIGS. 5, 6 and 7 show the module 8 in a preferred special embodiment. In the sideview of FIG. 5, a plane 12 is shown on which the light emitting diodes 13 are arranged as can be seen in FIG. 8. A reflecting arrangement 16 has, in this case, the form of a parabolic reflector having a circular upper rim 16' and a lower rim 16". The reflector 16 reflects light that is emitted by light emitting diodes 13 upwardly towards the reflecting arrangement 16 in a sidewise manner as indicated by arrows A in FIG. 5. A number of light emitting diodes 13 are arranged, preferably in a circle, around the lower rim 16" of reflecting arrangement 16. As a result, the spatial light emitting characteristics of the ACL 1 achieves 360° of reflected light. The plane 12 and the reflecting arrangement 16 are preferably arranged on a support 11. Another plane 22 can be arranged on the same support 11 or on another support. The other plane 22 faces with its back to the back of plane 12 (i.e., in the opposite direction) and carries a number of light emitting diodes 23 as well. Another reflecting arrangement 26 is arranged above the other plane 22. Above in this case means that the light emitted by the light emitting diodes 23 on plane 22 are emitted as well away from the plane 22 mostly in a perpendicular direction to the plane 22 and then falls on the reflecting arrangement 26 with upper rim 26' and lower rim 26". The reflected light is directed sidewardly as is shown, for example, for a single light beam with arrows B in the same manner as for the plane 12 with arrows A. So even if the reflecting arrangement 26 is below plane 22 in the drawing, it is meant and indicated here (in view of the direction of the light) that reflecting arrangement 26 is arranged above plane 22.

The exploded view of FIG. 8 shows the construction of an embodiment utilizing two planes 12 and 22. The arrangement of the planes 12 and 22 can be similar or identical above support 11 can be similar to the plane 12 and reflecting arrangement 16 shown in FIGS. 4 and 5. Plane 12 forms the plane on which the light emitting diodes 13 are arranged on support 11. However, the invention contemplates holding the diodes 13 in other ways in the ACL 1. The light emitting diodes 13 are preferably arranged in a circle on the plane 12 but could, of course, be arranged in other closed line forms such as, e.g., a rectangular form, an open line form, a matrix arrangement, or even in a random manner. The light emitting diodes 13 are preferably mounted directly on the plane 12 which is preferably a circuit board 12 that comprises the electric connections for the diodes 13. The diodes 13 are arranged, as already mentioned, in such a manner that their main direction of light emission is essentially perpendicular to plane or circuit board 12. The diodes 13 may be arranged and mounted by automatic equipment for arranging electronic parts on printed circuit boards. The reflecting arrangement 16, which is shown as the preferred parabolic circular rim reflector discussed above, is fixed to support 11 by, e.g., two screws 66. The screws 66 are shown above the reflecting arrangement 16 and are arranged to fix the module 8 to the housing part 3 as well. The printed circuit board 12 is fixed to support 11 by screws as well but could also be fixed, of course, by any known mechanisms to the preferred support or by other known mechanisms to the housing 3 of the ACL 1.

Figure 9:
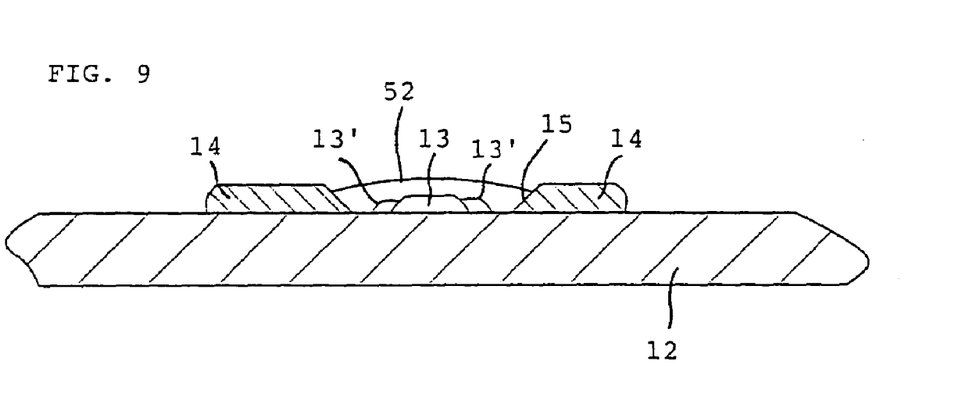
FIG. 9 shows a mounted LED.
Figure 10:
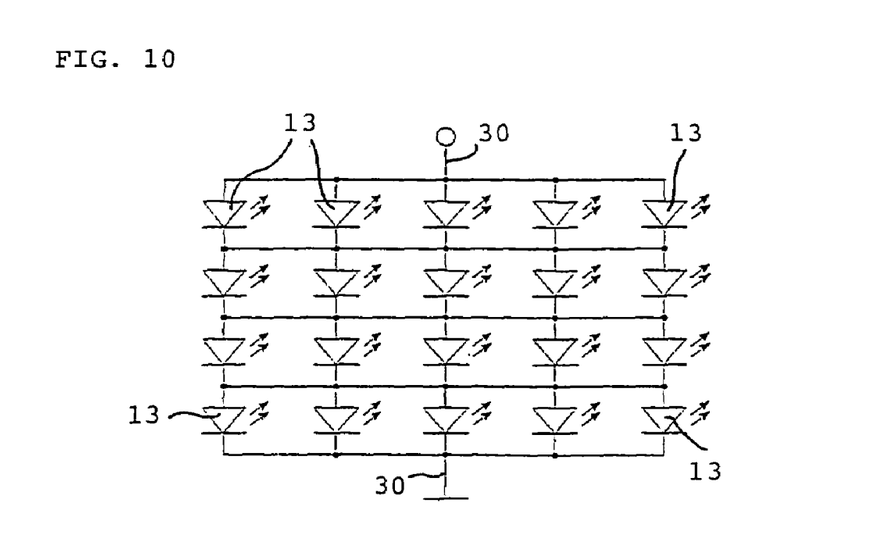
FIG. 10 shows a circuit diagram of the LEDs.

In this preferred embodiment, the number of light emitting diodes 13 is 20 but, of course, the number can be changed and/or varied. The light emitting diodes 13 are preferably connected electrically as shown in the circuit diagram of FIG. 10. Two electric connectors 30 connect all light emitting diodes on the printed circuit board to the electric feeding circuit which has been shown as a printed circuit board 6 in FIG. 4 only but which could be, of course, arranged in a different manner within the ACL 1. Each light emitting diode can be fed with a current of, for example, between approximately 0.5A and approximately 0.8A and preferably with a flash rate of, for example, approximately 44 pulses per minute. The on-time can be, for example, approximately 250 milliseconds. A type of diode suited for such an ACL 1 is, for example, the type MB042-SOL of red color. As already mentioned, it is preferred to arrange the light emitting diodes 13 directly on the plane 12 which is a circuit board. FIG. 9 shows an example wherein the light emitting diode chip 13 is mounted directly on printed circuit board plane 12 in known manner and bond wires 13' are connected from chip 13 directly to board 12. It is preferred that a transparent pourable plastic mass 52, for example, a silicone mass, is used to protect bond wires 13' and the light emitting diode chip 13. A frame 15 forms a compartment around each diode and contains the pourable mass 52 until this mass has sufficiently hardened.

In a preferred embodiment, as shown, further surrounding light reflecting arrangements are arranged around each or some of the light emitting diodes 13. This can be achieved in an easy manner by having a ring around each or some of diodes 13 with light reflecting tapered sidewalls that reflect light emitted sidewardly by the diodes in a manner essentially perpendicular to plane 12. In FIG. 8, a number of such surrounding reflecting arrangements 15 have the form of holes with tapered walls arranged in a ring shaped plate 14 that is fixed on plane 12 in such a manner that each diode 13 has its own reflector 15. Reflector 15 can be at the same time a frame 15 of the type shown in FIG. 9 and can receive the poured in transparent mass 52. In this way, most of the light emitted by diodes 13 is emitted perpendicular to plane 12 either directly by the diode or by reflection on surrounding reflecting arrangement/frame 15.

An additional reflecting arrangement 17 is also preferably provided in order to have a reflecting surface layer on plane 12 around each diode chip 13. The arrangement 17 can be, for example, a printed layer arranged on the plane 12 which is covered by a thin gold layer. Only the areas where the bond wires contact circuit board 12 and wherein the printed connectors lead from the bond wires to the contact areas of electric lines 30 on the printed circuit board are, of course, not covered by reflector 17.

As shown here as a preferred embodiment only, another or second plane 22 can be arranged on support 11. The other plane 22 can also be arranged within the housing of ACL 1 in another way. The second plane 22 is preferably arranged in a back to back position relative to the first mentioned plane 12. As can easily be seen in FIG. 8, the second plane 22 and the second reflecting arrangement 26 are mounted in a manner similar to that of the first plane 12 and the first reflecting arrangement 16. The screws 66 described above can also be used to fix reflector 26 as well. Electric lines 31 feed power to the second set of light emitting diodes 23 arranged on the plane 22. The second set of diodes are not visible in FIG. 8, but are indicated by arrow 23. An additional surrounding reflecting arrangement 24 has holes 25 with tapered walls which are arranged at the same positions as the light emitting diodes 23 in the same manner as reflecting arrangement 15). For the diodes 23, the additional reflecting arrangement 17 can be arranged as well on plane 22.

Figure 11:
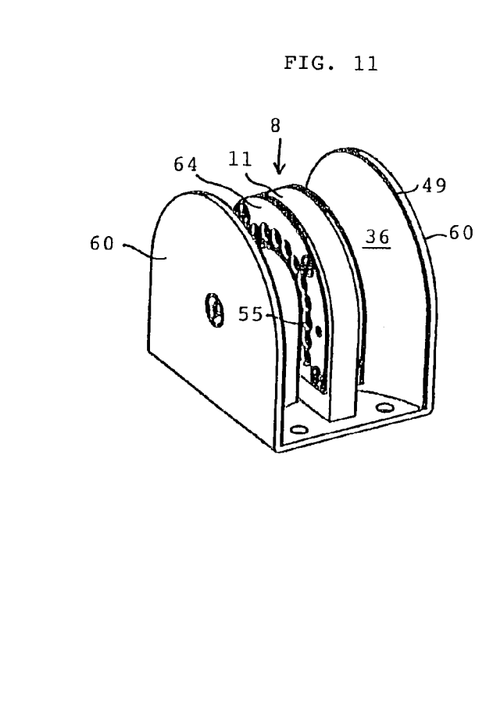
FIG. 11 shows another embodiment of a module in perspective view.
Figure 12:
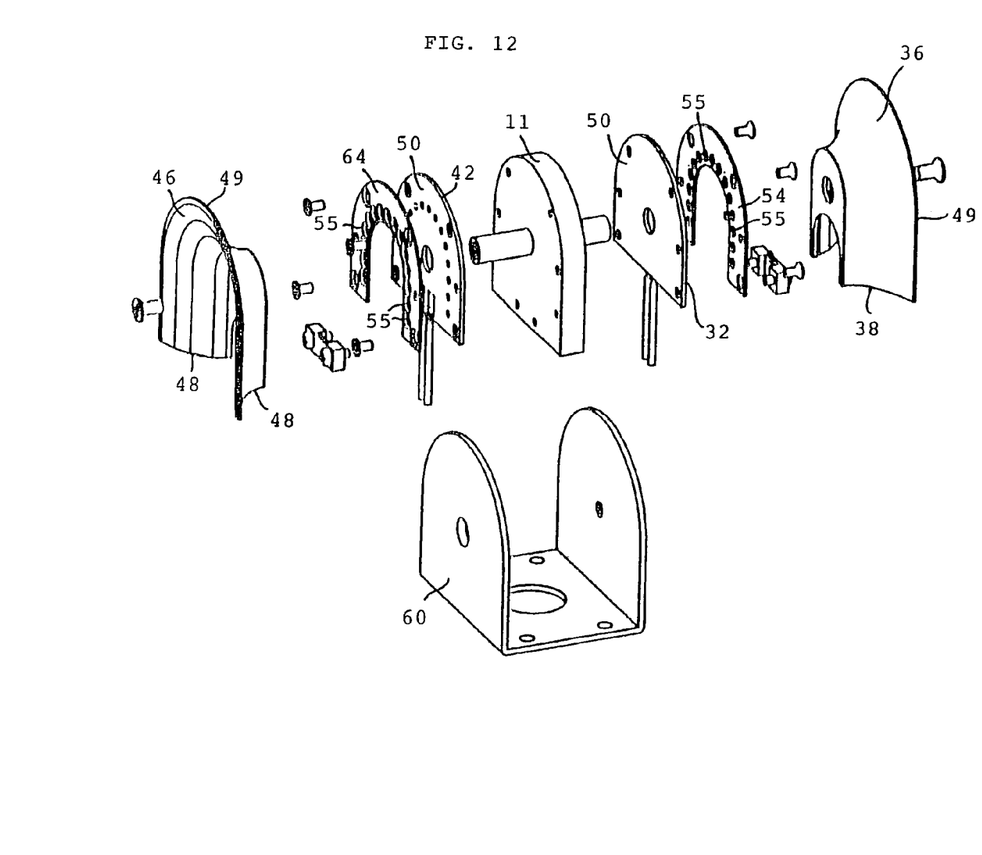
FIG. 12 shows the module of FIG. 11 in exploded view.

FIGS. 11 and 12 show another embodiment of a module 8 similar to the one described above but which does not emit light around a full circle (360°). Instead, the support 11 preferably has an approximately U-shape rim. The same holds true for circuit boards 50 with their U-shaped rims 32 and 42 and for the arrangement of the light emitting diodes. Surrounding reflecting arrangements 54 and 64, which also include holes 55, are preferably present as well as are additional reflecting arrangements in form of the layer on the planes/circuit boards. The main reflecting arrangements 36 and 46 with their rims 38 and 48 and the U-shaped rims 49 are preferably shaped in a parabolic way as well in order to direct light emitted by the diodes in a sidewards manner as explained above. The module 8 of this kind which is U-shaped, or shaped like a horseshoe, can also be arranged in a bracket 60 as shown in FIGS. 11 and 12. In this case as well, the module uses a housing which is not shown in the Figures and a clear cover which protects the module.

The ACL 1 according to the invention is not affected by vibrations as they occur on aircraft, has a relatively low weight, and has a very compact construction. The power consumption is also low compared to conventional ACLs. The preferred embodiment which includes a feeding circuit and an LED arrangement within the ACL itself is easy to mount to an aircraft (airplane or helicopter or other aircraft) and enhances the above advantages. The ACL can be NVIS (Night Vision Systems) friendly without requiring special filters due to the spectral characteristics of the LEDs used.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An anti collision light for an aircraft, the anti collision light comprising:
   a plurality of light emitting diodes (LEDs) arranged on a common plane;
   a frame arrangement mounted on the common plane and comprising a plurality of surrounding reflecting arrangements, at least some of the plurality of LEDs being surrounded by the surrounding reflecting arrangements, and each surrounding reflecting arrangement directing light emitted sidewardly by a respective LED in a direction essentially perpendicular to the plane and towards at least one reflecting arrangement; and
   the at least one reflecting arrangement arranged above the plane for reflecting light emitted by the plurality of LEDs essentially perpendicular to the plane and in a sidewards direction.

2. The anti collision light of claim 1, wherein the at least one reflecting arrangement comprises a reflector which is common to one of several of the plurality of LEDs and all of the plurality of LEDs.

3. The anti collision light of claim 1, wherein the plane is arranged on a circuit board and wherein the plurality of LEDs are mounted directly to the circuit board.

4. The anti collision light of claim 1, wherein each of the plurality of LEDs are surrounded by one of the surrounding reflecting arrangements.

5. The anti collision light of claim 1, further comprising:
   a second plurality of LEDs arranged on a second common plane, wherein the plane and the second plane face in opposite directions, and
   a second reflecting arrangement arranged above the second plane for reflecting light emitted by the second plurality of LEDS essentially perpendicular to the second plane and in a sidewards direction.

6. The anti collision light of claim 5, wherein the second reflecting arrangement comprises a second reflector common to one of several of the second plurality of LEDs and all of the second plurality of LEDs.

7. The anti collision light of claim 5, wherein the plane is arranged on a first circuit board, the second plane is arranged on a second circuit board, the plurality of LEDs are directly mounted to the first circuit board, and the second plurality of LEDs arc directly mounted to the second circuit board.

8. The anti collision light of claim 5, wherein at least some of the second plurality of LEDs are surrounded by second surrounding reflecting arrangements, each second surrounding reflecting arrangement directs light emitted sidewardly by a respective LED in a direction essentially perpendicular to the second plane and towards the second reflecting arrangement.

9. The anti collision light of claim 8, wherein the second surrounding reflecting arrangements are mounted on the second plane.

10. The anti collision light of claim 8, wherein the surrounding reflecting arrangements comprise first holes arranged on the frame arrangement, the frame arrangement being a first ring shaped part, and the first holes comprising reflecting sidewalls, and wherein the second surrounding reflecting arrangements comprise second holes arranged on a second ring shaped part, the second holes comprise reflecting sidewalls.

11. The anti collision light of claim 1, wherein the plurality of LEDs are arranged in a configuration.

12. The anti collision light of claim 11, wherein the configuration comprises one of a circular configuration, a curved configuration, a horseshoe configuration, and a matrix configuration.

13. The anti collision light of claim 5, further comprising a first additional reflecting arrangement arranged on the plane and a second additional reflecting arrangement arranged on the second plane.

14. The anti collision light of claim 13, wherein at least one of the first additional reflecting arrangement comprises a first reflecting layer arranged on the plane and the second additional reflecting arrangement comprises a second reflecting layer arranged on the second plane.

15. The anti collision light of claim 1, further comprising an additional reflecting arrangement arranged on the plane.

16. The anti collision light of claim 15, wherein the additional reflecting arrangement comprises a reflecting layer arranged on the plane.

17. The anti collision light of claim 5, wherein each of the reflecting arrangement and the second reflecting arrangement comprise a parabolically shaped reflecting surface and a circular outer rim.

18. The anti collision light of claim 5, wherein each of the reflecting arrangement and the second reflecting arrangement comprise a parabolically shaped reflecting surface.

19. The anti collision light of claim 1, wherein the reflecting arrangement comprises a parabolically shaped reflecting surface and a circular outer rim.

20. The anti collision light of claim 5, wherein the plane is arranged on one of a first circular plate and a first circular circuit board and wherein the second plane is arranged on one of a second circular plate and a second circular circuit board.

21. The anti collision light of claim 1, wherein the plane is arranged on one of a circular plate and a circular circuit board.

22. The anti collision light of claim 5, wherein each of the reflecting arrangement and the second reflecting arrangement comprise a parabolically shaped reflecting surface and two separate circular rims.

23. The anti collision light of claim 1, wherein the reflecting arrangement comprises a parabolically shaped reflecting surface, a circular outer rim and a circular inner rim.

24. The anti collision light of claim 5, wherein each of the reflecting arrangement and the second reflecting arrangement comprise a parabolically shaped reflecting surface and at least one of two separate horse-shoe and u-shaped rims.

25. The anti collision light of claim 1, wherein the reflecting arrangement comprises a parabolically shaped reflecting surface, at least one of a horse-shoe and U-shaped outer rim and at least one of a horse-shoe and U-shaped inner rim.

26. The anti collision light of claim 5, wherein each of the reflecting arrangement and the second reflecting arrangement comprise a parabolically shaped reflecting surface, a U-shaped rin, and a linear edge.

27. The anti collision light of claim 1, wherein the reflecting arrangement comprises a parabolically shaped reflecting surface, a U-shaped rim, and a linear edge.

28. The anti collision light of claim 1, wherein the plurality of LEDs are lensless LEDs.

29. The anti collision light of claim 1, wherein at least some of the plurality of LEDs are covered by a material which comprises at least one of a light transparent mass and a pourable silicone mass.

30. The anti collision light of claim 29, wherein the frame arrangement comprises a frame for the material.

31. The anti collision light of claim 5, further comprising a support arranged to support and space apart the plane and the second plane.

32. The anti collision light of claim 1, further comprising a support arranged to support the plane.

33. The anti collision light of claim 5, wherein the plane, the second plane, the reflecting arrangement, and the second reflecting arrangement are arranged along at least one of a common longitudinal axis and an axis that is the same as a socket of the anti collision light.

34. The anti collision light of claim 1, wherein the plane and the reflecting arrangement are arranged along at least one of a common longitudinal axis and an axis that is the same as a socket of the anti collision light.

35. The anti collision light of claim 5, wherein the plane, the second plane, the reflecting arrangement and the second reflecting arrangement are arranged within a U-shaped bracket.

36. The anti collision light of claim 1, wherein the plane and the reflecting arrangement are arranged within a U-shaped bracket.

37. The anti collision light of claim 5, further comprising a housing, a first circuit board and a second circuit board, wherein the plurality of LEDs, the second plurality of LEDs, and the first and second circuit boards are arranged within the housing.

38. The anti collision light of claim 1, further comprising a housing and a circuit board, wherein the plurality of LEDs and the circuit board are arranged within the housing.

39. An anti collision light for an aircraft, the anti collision light comprising:
a plurality of light emitting diodes (LEDs) mounted directly on and sharing a plane with a circuit board;
a reflecting arrangement arranged above the circuit board for reflecting light emitted by the plurality of LEDs essentially perpendicular to the plane of the circuit board in a sidewards direction; and
at least one of the plurality of LEDs being surrounded by a surrounding reflecting arrangement mounted on the plane of the circuit board and directing light emitted sidewardly by the at least one of the plurality of LEDs in a direction essentially perpendicular to the plane.

40. An anti collision light for an aircraft, the anti collision light comprising:
a first plurality of light emitting diodes (LEDs) mounted directly on and sharing a plane with a first circuit board;
a first reflecting arrangement arranged above the first circuit board for reflecting light emitted by the first plurality of LEDs essentially perpendicular to the plane of the first circuit board in a sidewards direction;
at least one of the first plurality of LEDs being surrounded by a first surrounding reflecting arrangement mounted on and sharing a plane with the first circuit board and directing light emitted sidewardly by the at least one of the first plurality of LEDs in a direction essentially perpendicular to the plane of the first circuit board;

a second plurality of LEDs mounted directly on a second circuit board;

a second reflecting arrangement arranged above the second circuit board for reflecting light emitted by the second plurality of LEDs essentially perpendicular to a plane of the second circuit board in a sidewards direction; and at least one of the second plurality of LEDs being surrounded by a second surrounding reflecting arrangement mounted on the second circuit board and directing light emitted sidewardly by the at least one of the second plurality of LEDs in a direction essentially perpendicular to the plane of the second circuit board.

41. The anti collision light of claim 40, wherein the plane of the first circuit board and the plane of the second circuit board face in opposite directions.

42. The anti collision light of claim 40, further comprising at least one of a first additional reflecting arrangement and a second additional reflecting arrangement.

43. The anti collision light of claim 42, wherein at least one of the first and second additional reflecting arrangements comprise a reflecting layer.

44. The anti collision light of claim 1, wherein the frame arrangement comprises a plate and the plane comprises an outer surface of a circuit board.

45. The anti collision light of claim 1, wherein the frame arrangement comprises a ring shaped plate and the plane comprises an outer surface of a circuit board.

46. The anti collision light of claim 1, wherein the frame arrangement comprises a U-shaped plate and the plane comprises an outer surface of a circuit board.

* * * * *